United States Patent
Leong et al.

(10) Patent No.: US 9,296,663 B1
(45) Date of Patent: Mar. 29, 2016

(54) METHOD TO PRESERVE THE NON-DETONABLE NATURE OF CAN FERTILIZER

(71) Applicants: Stephen M. Leong, Randolph, NJ (US); Andrew J. Pskowski, Ridgewood, NJ (US); Thomas J. Kiel, Bernardsville, NJ (US)

(72) Inventors: Stephen M. Leong, Randolph, NJ (US); Andrew J. Pskowski, Ridgewood, NJ (US); Thomas J. Kiel, Bernardsville, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 179 days.

(21) Appl. No.: 14/051,793

(22) Filed: Oct. 11, 2013

Related U.S. Application Data

(60) Provisional application No. 61/712,896, filed on Oct. 12, 2012.

(51) Int. Cl.
  *C05G 3/00* (2006.01)
  *C05C 1/00* (2006.01)

(52) U.S. Cl.
  CPC ... *C05G 3/00* (2013.01); *C05C 1/00* (2013.01); *C05G 3/0029* (2013.01)

(58) Field of Classification Search
  None
  See application file for complete search history.

(56) References Cited

U.S. PATENT DOCUMENTS

| | | | | |
|---|---|---|---|---|
| H001070 H | * | 7/1992 | Harrison | C05D 1/005 23/313 P |
| 2012/0272700 A1 | * | 11/2012 | Nevin | 71/12 |

FOREIGN PATENT DOCUMENTS

| | | | | |
|---|---|---|---|---|
| WO | WO 2009151316 A2 | * | 12/2009 | C05G 3/00 |

OTHER PUBLICATIONS

Ni et al. "Environmentally Friendly Slow-Release Nitrogen Fertilizer". J. Agric. Food Chem., 2011, 59 (18), pp. 10169-10175.*

* cited by examiner

*Primary Examiner* — Jennifer A Smith
(74) *Attorney, Agent, or Firm* — Henry S. Goldfine

(57) ABSTRACT

A method to prevent the removal or deactivation of the calcium carbonate diluent from calcium ammonium nitrate (CAN) fertilizer by terrorists or insurgents attempting to produce home-made-explosives, such as ANFO. A first embodiment involving dry mixing an organic polymer and CAN fertilizer—such that if the mixture is added to water a hydrogel will be formed defeat the separation of the calcium carbonate. A second embodiment involving adding encapsulated water or encapsulated urea, such that if the mixture is ground to a fine powder to defeat the effect of the diluent—the released urea will take water out of the atmosphere or the released water (from the encapsulated water) will interact with the organic polymer to create a hydrogel, to maintain the non-detonability of the CAN.

3 Claims, No Drawings

METHOD TO PRESERVE THE NON-DETONABLE NATURE OF CAN FERTILIZER

CROSS REFERENCE TO RELATED APPLICATION

This application claims the benefit of U.S. Provisional Patent Application Ser. No. 61/721,896 filed Oct. 12, 2012 which is incorporated by reference as if set forth at length herein.

U.S. GOVERNMENT INTEREST

The inventions described herein may be manufactured, used and licensed by or for the U.S. Government for U.S. Government purposes.

FIELD OF THE DISCLOSURE

This disclosure relates generally to the field of home-made explosives and improvised explosive devices, and more specifically, to a method of preserving the non-detonable nature of calcium ammonium nitrate (CAN) fertilizer and preventing the separation of the explosive ammonium nitrate component therefrom.

BACKGROUND OF THE DISCLOSURE

An explosion may be defined as a self-sustaining chemical reaction which rapidly expands into a much greater volume. The degree of destruction caused by such an event is significantly influenced by the pressure wave created by gas expanding therefrom. Such a pressure wave can be created by low explosives—wherein there is combustion or rapid burning of the explosive material (i.e. deflagration); or, by high explosives—wherein there is detonation of the explosive material itself. With deflagration, the reaction velocity is less than the velocity of sound (normally in the range of 600 to 1000 m/s) and the pressure wave created is measured in bars. Typically deflagration occurs with such explosives as black powder, smokeless powders, propellants and pyrotechnics. In contrast, with detonation a short duration, supersonic shock wave is produced and a longer lasting, significant gas pressure wave follows. The velocity of a detonation event is considered to be in excess of 1800 m/s. Typically detonation occurs with what are termed primary, and secondary explosives. Primary explosives are relatively easy to initiate (i.e. very sensitive) and include such materials as lead azide, lead styphnate, and diazodinitrophenol (DDNP). Secondary explosives are less easy to initiate (i.e. less sensitive—generally requiring a shock wave for their initiation) and include such materials as octahydro-1,3,5,7-tetranitro-1,3,5,7-tetrazocine (HMX), 1,3,5-triazacyclohexane (RDX), and ammonium nitrate based explosives.

Terrorists and illicit bomber or insurgent IED makers may obtain explosive materials legally, or fraudulently, or by theft from military or commercial sources—or by improvising and mixing together widely available oxidizers and fuels to create an explosive—such as the mixture of ammonium nitrate (AN), an oxidizer, and fuel oil, a fuel, to create the explosive ANFO. Fuel oil is universally available as is AN—as AN is produced in enormous quantities and sold world-wide for use as a fertilizer and as an ingredient in legitimate blasting agents. In fact, AN based devices were used in the 2011 bombings in Delhi and Oslo, and the 2013 Hyderabad, India blasts—as well as—in the Alfred P. Murrah Federal Building in Oklahoma City bombing in 1995. The Oklahoma City bombing involved an ANFO device containing 4,800 pounds (2,200 kg) of ammonium nitrate fertilizer, nitromethane, and diesel fuel mixture (a blast calculated to be equivalent to 5000 pounds (2,300 kg) of trinitrotoluene (TNT)).

Another readily available explosive material is urea nitrate (UN) fertilizer—which is itself classified as a high explosive (containing both the oxidizing and fuel moieties of a secondary explosive material). In fact, UN has a destructive power similar to AN explosives, with a velocity of detonation of about 11,155 ft/s (3,400 m/s)—about half of that of TNT. A 1,336 pound (606 kg) urea nitrate (UN) fertilizer based explosive device was used to attack the World Trade Center in 1993.

As stated above, AN is a widely available, easily purchased chemical—due to its common use as a fertilizer and as an ingredient in mining explosives. In fact, reportedly, about 65% of the reported 16,300 IEDs detonated in Afghanistan in 2012 contained AN. AN is generally produced/available as a prilled bead, i.e. a generally spherical particle, resembling small shot or BB's. Various prills have been developed—some nearly solid with relatively glossy surface for use in explosives (where handling and long storage characteristics are important)—some with relatively non-porous surface (that tends to dissolve slowly—for fertilizer purposes). However, regardless of the prill, there has been little international success in rendering the AN material inert or in significantly reducing its explosive potential for large illegal bombs—without materially impacting its ability to function as a fertilizer.

U.S. Pat. No. 3,366,468 to Porter, titled "Method of Desensitizing Fertilizer Grade Ammonium Nitrate and the Product Obtained disclosed and claimed a method of rendering fertilizer grade AN by adding 5 to 10% mono- and diammonium phosphate, or a mixture thereof, with potassium chloride or ammonium sulfate. It is now understood that phosphate additives do not prevent the ammonium nitrate from exploding, and in fact, the energy released from an explosive of the ammonium nitrate/phosphate mix may be even greater than the energy from pure ammonium nitrate. Furthermore, the ammonium phosphate additives can be easily removed from the ammonium nitrate/phosphate mix through the addition of calcium nitrate which in turn forms even more ammonium nitrate. Thus, it is clear that the phosphate additives do little, if anything, to increase the stability of ammonium nitrate or deter terrorist activity therewith.

Alternatively, calcium ammonium nitrate (CAN) fertilizer, also known as nitro-limestone, was developed, manufactured and sold as a non-detonable alternative to AN—CAN contains about 20 to 25% calcium carbonate ($CaCO_3$). The calcium carbonate is slurried with ammonium nitrate to form CAN—which crystallizes as a hydrated double salt ($5Ca(NO_3)_2.NH_4NO_3.10H_2O$). The calcium carbonate is a diluent—physically separating the AN components such that an explosive reaction will not be sustained. However, as reported by the U.S. military's Joint Improved Explosive Device Defeat Organization (JIEDDO), see https://www.jieddo.mil/content/docs/JIEDDO_HME_Tri-fold_v3.pdf, insurgents routinely use two alternative methods to process CAN-26 (26% nitrogen and 25% $CaCO_3$ diluent) into an AN oxidizing agent for use in ANFO devices. In the first method, the very soluble AN is separated from the insoluble carbonate diluent in the CAN by dissolving the CAN in hot water and simply decanting concentrated AN solution. Alternatively, the CAN is ground into a fine powder, without extracting the inert carbonate, and then functionally used in place of pure AN in the explosive device (the grinding process eliminating the physical separation provided by the diluent). In either case, CAN is reprocessed into a functional home-made-explosive (HME) AN or AN equivalent material.

Therefore, there is a need in the art for a method to defeat any modification of non-detonable CAN fertilizer to render it usable in any home-made-explosive (HME) device—as an AN explosive component, while maintaining its functionality as fertilizer.

SUMMARY OF THE INVENTION

The present invention relates to the above stated need in the art, which is a method of preventing the removal of, or defeat of, the calcium carbonate diluent within CAN fertilizer, to preserve the non-detonatable nature of this material. The inventive method involves dry mixing of CAN fertilizer with an effective quantity (i.e. from about 1 to about 50 weight percent) of an organic polymer, or blend of organic polymers, including one or more of the following organic polymers: polyethylene glycol (PEG), hydroxyethyl cellulose (HEC), carboxymethyl cellulose (CMC), or other sugar (cellulose)-based polymer or cellulose gum, where the physical particle size of the fertilizer and organic polymer(s) are approximately the same. Whereby, when at least a small quantity of water is added to the mixture of the organic polymer and fertilizer, the mixture will form a gelatinous mass or slurry—which will not allow the calcium carbonate, or similar diluent, to be separated therefrom. And, which organic polymer additive does not affect the fertilizer functionality of the CAN fertilizer.

An alternative embodiment of the present inventive mixture includes, in addition to the CAN, and the organic sugar-based or cellulose gum polymer or blend thereof, a quantity of thin film coated, or encapsulated droplets of water or of urea—such that, if the CAN fertilizer/organic polymer mixture is subjected to mechanical grinding or crushing (i.e. being ground to a fine powder), the thin-film/encapsulated water or urea will rupture and the mixture will liquefy—due to the action of the now unencapsulated water, or the action of the urea to hydroscopically attract water from the ambient air—and then, In the presence of the unencapsulated water, or water provided by the urea—the organic polymer will form a hydrogel or slurry and thereby defeat any efforts to separate the diluent from therefrom or to allow intimate contact between the AN components within the CAN and thereby defeat the diluents' effect (i.e. continuing to prevent the CAN itself from being used as explosive ingredient). Importantly, if the urea is encapsulated in an organic polymer—the quantity of organic polymer encapsulating material will itself be sufficient to create the desired hydrogel and defeat any attempt to eliminate the diluent effect of the calcium carbonate (i.e. making the CAN non-detonable).

DETAILED DESCRIPTION OF PREFERRED EMBODIMENT

The following merely illustrates the principles of the disclosure. It will thus be appreciated that those skilled in the art will be able to devise various embodiments which, although not explicitly detailed herein, embody the principles of the disclosure and are included within its spirit and scope.

As detailed above, the present invention provides a method of preventing the removal of, or defeat of, the calcium carbonate diluent within CAN, or any similar diluent used within any AN or UN fertilizer, to keep such a non-detonable fertilizer unusable as an explosive component. As further detailed above, there are embodiments of the present invention which overcome the two methods by which terrorists or insurgents process CAN fertilizer to either extract the detonable AN therefrom or to simply make the CAN itself detonable. Specifically:

The first method used by terrorists or insurgents to extract detonable AN is to dissolve CAN fertilizer in hot water—wherein the relatively insoluble calcium carbonate diluent will precipitate out, then decant the concentrated ammonium nitrate solution to obtain the desired AN explosive ingredient. The first embodiment of the present invention—to defeat this process of removing the calcium carbonate diluent—is to dry mix a quantity of from about 1 to about 50% by weight of organic polymer, a sugar (cellulose)-based polymer or cellulose gum with the CAN. Whereby, if this mixture is added to hot water (to form an aqueous solution), the polymer will cross-link and form a network—such that the mixture will form a hydrogel, or thick slurry, from which the calcium carbonate will not precipitate and from which it will not be possible to decant any AN explosive ingredient.

The second method used by terrorists and insurgents to simply make the non-detonable CAN itself detonable—by grinding the CAN into a fine powder—thereby defeating the separation of the AN components therein and making the material itself detonable. With respect to this grinding of CAN method to defeat the non-detonability of CAN—the second embodiment of the present invention is to dry mix with the first embodiment detailed above (i.e. CAN containing about 1 weight percent or more of an organic polymer—up to about 50 weight percent) about 5 weight percent of a thin-film (i.e. encapsulated) water droplets. Whereby, if the CAN is ground (i.e. crushed)—an effective quantity of water is added to the CAN/organic polymer mixture when the encapsulated water is released as its capsules are broken during the grinding or crushing thereof—whereupon, the organic polymer will mix with the water and thereby polymerize/network such that the CAN mixture will become a hydrogel or thick slurry—which will maintain the calcium carbonate diluent therein (separating the AN components) and maintain the CAN's non-detonable character. Further, if this three component mixture (CAN fertilizer/organic polymer/encapsulated water) is added to hot water in an attempt to separate the AN explosive component—as stated above, the organic polymer will form a hydrogel to defeat such an act.

In an alternative third embodiment to the second embodiment detailed above, rather than mixing into the CAN/organic polymer mixture a quantity of encapsulated water droplets—a quantity of urea encapsulated droplets can be added. If this CAN/organic polymer/encapsulated urea is ground—the urea (which is very hydroscopic) will absorb/take a small quantity of water out of the surrounding air—and this water is sufficient to allow the mixture to liquify, such that the water will react with the organic polymer, and the polymer will polymerize/network, such that (again) the mixture will turn into a hydrogel or thick slurry—which will maintain the calcium carbonate diluent therein and its non-detonable character. Again, if this mixture containing CAN and organic polymer is placed in hot water in an attempt to separate the AN explosive component therefrom—such an attempt will fail, as the mixture will turn to a hyrdogel (as detailed above).

As stated above, the various organic polymers useful in the present invention are sugar (cellulose)-based polymer or cellulose gum; especially, polyethylene glycol (PEG), hydroxyethyl cellulose (HEC), carboxymethyl cellulose (CMC). Further, the any organic polymer used in the current invention will be a powder having a particle size roughly that of the prilled CAN fertilizer particles—which is important to prevent any terrorist or insurgent from simply physically separating the prilled fertilizer from the organic polymer using a sized sieve. Further, the size of any encapsulated water or urea powder/particles, in the alternative embodiments of the subject invention, should also be roughly the same size as the prilled CAN—again, to avoid anyone being able to remove the encapsulated water or urea powder/particles from the inventive mixture. Finally, the HEC and CMC organic polymers powders/particles are available from Ashland Aqualon Functional Ingredients, located in Wilmington, Del. 19894-0001 (www.ashland.com) and where the PEG organic polymer is available from the Dow Chemical Company (www.dow.com).

The alternative embodiments of the present invention, as detailed above, may include (1) a CAN and organic polymer mixture, or (2) a CAN, organic polymer, and encapsulated water or encapsulated urea mixture. A further embodiment, useful in the present invention is where the CAN is mixed with encapsulated water or urea, and the encapulation material is the organic polymer—such that the quantity of the ogranic polymer may be less than 1 weight percent of the entire mixture.

Specific examples of the various embodiments of the present invention are presented below:

EXAMPLE 1

Several alternative embodiments of the CAN and organic polymer mixture of the subject invention were prepared, as detailed in Table 1 and the paragraph thereafter, below:

TABLE 1

|        | CAN Fertilizer (Wt. Percent) | Organic Polymer (Wt. Percent) |
|--------|------------------------------|-------------------------------|
| Case 1 | 98.75                        | 1.25                          |
| Case 2 | 95                           | 5                             |
| Case 3 | 75                           | 25                            |
| Case 4 | 50                           | 50                            |

In all four alternative embodiment cases shown in Table 1—the particular weight percentages shown of CAN fertilizer and organic polymer were dry mixed—to obtain a uniform mixture (the total weight of each case was 10 g). When a amount of water, (i.e. about 7.5 g) was added to each mixture a hydrogel/thick slurry was formed, inhibiting any phase separation of calcium carbonate ($CaCO_3$) from liquid hyrdogel/thick slurry.

EXAMPLE 2

Two alternative dry mixes of the CAN, and organic polymer encapsulating urea were prepared—i.e. two alternative embodiments of the subject invention—as detailed below in Table 2.

TABLE 2

|        | CAN Fertilizer (Wt. Percent) | Urea Encapsulated in Organic Polymer (Wt. Percent) |
|--------|------------------------------|----------------------------------------------------|
| Case 1 | 90                           | 10                                                 |
| Case 2 | 95                           | 5                                                  |

In the two alternative embodiment cases shown in Table 2—the particular weight percentages shown of CAN fertilizer and organic polymer encapsulated urea particles were dry mixed—to obtain a uniform mixture (the total weight of each case was 10 g). When the mixture was mechanically ground/crushed, the resulting mixture formed a hydrogel/thick slurry that maintains the non-detonable effect of the calcium carbonate ($CaCO_3$) diluent therein and did not allow the calcium carbonate diluent to be removed therefrom.

A similar experiment to Example 2 was performed, however rather than Urea being encapsulated in the organic polymer—water was encapsulated in the organic polymer. The same positive results were obtained when the mixture was mechanically ground/crushed, i.e. a hydrogel/thick slurry was formed, which did not allow the calcium carbonate to be separated form the mixture and the mixture remained non-detonable. And, with the mixture in the hydrogel form—it was not possible to separate the calcium carbonate therefrom, to obtain any pure AN explosive material.

EXAMPLE 3

Two alternative embodiments of the CAN, organic polymer, and encapsulated urea mixture of the subject invention were prepared as detailed in Table 3, below:

TABLE 3

|        | CAN Fertilizer (Wt. Percent) | Encapsulated Urea (Wt. Percent) | Organic Polymer (Wt. Percentage) |
|--------|------------------------------|---------------------------------|----------------------------------|
| Case 1 | 93.75                        | 5                               | 0.125                            |
| Case 2 | 50                           | 25                              | 25                               |

In the two alternative embodiment cases shown in Table 3—the particular weight percentages shown of CAN fertilizer and organic polymer and encapsulated urea particles were dry mixed—to obtain a uniform mixture (the total weight of each case was 10 g). When the mixture was either added to hot water or mechanically ground/crushed, the resulting mixture was a non-detonable hydrogel/thick slurry that inhibiting any phase separation of calcium carbonate ($CaCO_3$) from liquid hydrogel/thick slurry.

At this point, while we have discussed and described the invention using alternative preferred embodiments, those skilled in the art will recognize that our teachings are not so limited. Accordingly, the invention should be only limited by the scope of the claims attached hereto.

The invention claimed is:

1. A method to prevent the removal of calcium carbonate from calcium ammonium nitrate fertilizer, comprising:
   (a) dry mixing about 1 to about 50 weight percent of an organic polymer selected from the group consisting of polyethylene glycol (PEG), hydroxyethyl cellulose (HEC), carboxymethyl cellulose (CMC) and cellulose gum with about 99 to about 50 weight percent of calcium ammonium nitrate fertilizer to form a physically distinct mixture of organic polymer and calcium ammonium nitrate; wherein the physical particle size of the calcium ammonium nitrate fertilizer and the organic polymer are approximately the same in said dry mixture;
   (b) whereby, if water is added to the mixture it will form a hydrogel from which the calcium carbonate cannot be removed.

2. The method of preventing the removal of calcium carbonate from calcium ammonium nitrate fertilizer of claim 1, wherein the dry mixture contains:
   (a) about 93.75 to about 50 weight percentage of CAN;
   (b) from about 0.125 to about 25 weight percent of organic polymer; and
   (c) from about 5 to about 25 weight percent of physically distinct particles of encapsulated urea;

(d) such that water is added to the dry mixture it will form a hydrogel from which the calcium carbonate cannot be removed; and (e) if the dry mixture is ground to a fine powder, the encapsulated urea will be released and absorb water from the surrounding atmosphere, whereby the dry mixture will liquefy and the organic polymer will react with the water to form a hydrogel that will maintain the non-detonatable nature of the CAN fertilizer.

3. A method to prevent the removal of calcium carbonate from calcium ammonium nitrate fertilizer, comprising:

(a) dry mixing about 10 to about 5 weight percent of an organic polymer selected from the group consisting of polyethylene glycol (PEG), hydroxyethyl cellulose (HEC), carboxymethyl cellulose (CMC) and cellulose gum, encapsulated urea, with about 90 to about 95 weight percent of calcium ammonium nitrate fertilizer to form a physically distinct mixture of organic polymer, encapsulated urea and calcium ammonium nitrate; wherein the physical particle size of the calcium ammonium nitrate fertilizer and organic polymer are approximately the same in said dry mixture;

(b) whereby, if the mixture is ground to a fine powder it will form a hydrogel that will maintain the non-detonatable nature of the CAN.

* * * * *